(12) United States Patent
Leymann et al.

(10) Patent No.: US 6,442,572 B2
(45) Date of Patent: Aug. 27, 2002

(54) METHOD OF AND COMPUTER SYSTEM FOR PERFORMING A TRANSACTION ON A DATABASE

(75) Inventors: Frank Leymann, Aidlingen; Dieter Roller, Schoenaich, both of (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/238,197

(22) Filed: Jan. 27, 1999

(30) Foreign Application Priority Data

Jan. 28, 1998 (EP) .............................. 98101417

(51) Int. Cl.$^7$ ............................................. G06F 17/30
(52) U.S. Cl. ........................... 707/203; 709/1; 709/100
(58) Field of Search .................. 707/103, 104, 707/101, 539, 10, 4, 203, 202; 705/7; 709/1, 100

(56) References Cited

U.S. PATENT DOCUMENTS 5,473,680 A * 12/1995 Porter ........................ 379/201
5,721,909 A * 2/1998 Oulid-Aissa et al. ........ 395/610
5,734,837 A * 3/1998 Flores et al. ................. 395/207
5,970,490 A * 10/1999 Morgenstern ................ 707/10
6,016,394 A * 1/2000 Walker ........................ 395/701
6,076,092 A * 6/2000 Goldberg et al. ........... 707/103
6,158,044 A * 12/2000 Tibbetts .......................... 717/1

* cited by examiner

Primary Examiner—Jean M. Corrielus
Assistant Examiner—Tam V Nguyen
(74) Attorney, Agent, or Firm—Robert P. Tassinari; Anne Vachon Dougherty

(57) ABSTRACT

A method of performing a transaction on a database. A number of transactions are available to be performed on said database. At least one of said transactions may only be performed if corresponding requirements are fulfilled, wherein the fulfillment of said requirements depends on the prior successful termination of at least one other transaction. Then, said at least one of said transactions is invoked. Depending on stored information relating to prior successful terminations of transactions it is then checked whether said corresponding requirements are fulfilled. If said requirements are fulfilled, said transaction is performed. Then, after a successful termination of said transaction, an information relating to said successful termination is stored.

15 Claims, 1 Drawing Sheet

METHOD OF AND COMPUTER SYSTEM FOR PERFORMING A TRANSACTION ON A DATABASE

FIELD OF THE INVENTION

The invention relates to a method of and a computer system for performing a transaction on a database, wherein a number of transactions are available to be performed on said database, and wherein at least one of said transactions may only be performed if corresponding requirements are fulfilled, wherein the fulfillment of said requirements depends on the prior successful termination of at least one other transaction or on said at least one of said transactions being a first transaction.

BACKGROUND OF THE INVENTION

The integrity of databases is vital for today's enterprises. Therefore, database management systems are used to perform and control all accesses to and changes of the database. In order to improve the integrity of a database, so-called semantical integrity rules or requirements are included in the database management system which ensure the compliance of the data in the database with known business rules.

One kind of these rules are so-called dynamic semantical integrity rules or requirements. They ensure that a transition of the database state may only be performed if at least one specific datastate was present in a series of prior database states. Dynamic semantical integrity rules therefore deal with prior database states which relate to successful terminations of prior transactions performed on the database.

For example: The promotion of an employee is only valid if the job code of the employee has been increased some time prior to the promotion. The transaction of promoting the employee may therefore only be performed if the requirement is fulfilled that the prior transaction of increasing the job code of the employee has terminated successfully.

To implement and/or monitor such dynamic semantical integrity rules or requirements, the core of the database management system would have to be modified. Because of the risk of changing a stable system, such a modification is usually avoided.

It is an objective of the invention to provide a method and a computer system which is able to enforce dynamic semantical integrity rules without having the need to change the database management system at its core.

SUMMARY OF THE INVENTION

This objective is solved by a method as described above with the following additional steps: said at least one of said transactions is invoked, depending on stored information related to prior successful terminations of transactions it is checked whether said corresponding requirements are fulfilled, if said requirements are fulfilled, said transaction is performed, and after a successful termination of said transaction, an information relating to said successful termination is stored.

Any successful termination of a transaction is stored. This provides the possibility to check whether a specific prior transaction was terminated successfully. Furthermore, specific rules or requirements are assigned to at least some of the provided transactions. These rules relate to the prior successful termination of at least one other transaction. If a transaction is invoked, it is first of all checked which requirements have to be fulfilled to start this transaction i.e. which other transaction or transactions must have terminated successfully before the present transaction can be performed or whether the present transaction is a first transaction which has no predecessors and which therefore must be performed first. Then, for the first mentioned requirements, it is checked whether this or these other prior transactions were actually terminated successfully. If this is the case, the invoked present transaction is performed. If the transaction terminates successfully, this information is stored.

The invention stores all successful terminations of transactions separately. Therefore, it is possible to check the fulfillment of specific requirements with the help of this stored information. No further modification, in particular almost no modification of the database management system is necessary. The invention enables the database management system to enforce the dynamic semantical integrity rules on the basis of the stored information.

It is possible to built a new database management system including dynamic semantical integrity rules and their enforcement according to the invention. However, even more important, it is possible to expand a given database management system by including the dynamic semantical integrity rules and their enforcement afterwards. This may be done with only minor changes in the database management system, in particular with no changes in the core of the database management system.

In an advantageous embodiment of the invention a sequence checker is provided for checking whether said corresponding requirements are fulfilled and for storing said information. The sequence checker is the tool for establishing the information about the prior successfully terminated transactions. It also is used for checking this information i.e. for checking the fulfillment of the dynamic semantical integrity rules or requirements.

It is most advantageous if said sequence checker includes or is a part of or is able to access or is a workflow management system. Such a workflow management system usually provides all features required by the sequence checker. In particular, a workflow management system is able to execute and to store the flow within a process. This ability may be used to execute and store the flow of subsequent successfully terminated prior transactions. Any successfully terminated transaction therefore triggers a transition in the workflow management system from a first node to a second node wherein each of these nodes represent database state transitions.

The workflow management system therefore always includes "an image" of the successfully terminated prior transactions performed on the database. As a consequence, the workflow management system is always able to check whether specific requirements relating to the successful termination of prior transactions are fulfilled or not.

The use of a workflow management system has therefore the advantage that dynamic integrity of a database may be achieved very easily. The workflow management system provides all necessary functions to establish the integrity according to the invention.

In an advantageous embodiment of the invention a transaction terminator is provided for creating said information relating to said termination. This transaction terminator is therefore the interface to the sequence checker. The created information is then transferred from the transaction terminator to the sequence checker to be stored there.

It is advantageous if said transaction terminator is a part of or is coupled with a database management system controlling said database. The transaction terminator is therefore the only additional part which has to be added to the database management system. As already mentioned, this part does not impact the core of the database management system at all. Instead, it may be added to the database management system as an additional task or the like.

The transaction terminator and the sequence checker represent interface between the database management system and the workflow management system. They have to be adapted to each other so that they are able to exchange the relevant information. Therefore, the invention may be realized in a very effective manner by the establishment of this interface.

In a further embodiment of the invention, said information is processed as a transition of said database from a first state to a second state. Any successfully terminated transaction has therefore the consequence that the database changes from the first database state into the second database state. This transition is stored in the sequence checker or in the workflow management system due to the received information. The "image" of the database is thereby updated in the sequence checker or in the workflow management system.

In a further embodiment of the invention, the fulfillment of said requirements is checked by examining the present state of the database. The present database state is represented by the "image" of the database stored in the sequence checker or in the workflow management system. On the basis of this "image", the mentioned fulfillment of requirements is examined.

BRIEF DESCRIPTION OF THE DRAWINGS

Further advantageous features of the invention are disclosed in the following description of an embodiment of the invention which is shown in appended drawings wherein.

DETAILED DESCRIPTION OF THE PREFERRED EMBODIMENT

A database is usually controlled by a database management system. Any access to the database is performed by a transaction on the database which is processed by the database management system. A transaction is a database manipulation which transforms the database from a first consistent state into a second consistent state.

In order to ensure the integrity of the database, i.e. the integrity of the data in the database, so-called semantical integrity rules were established and included in the database management system. These integrity rules are checked by the database management system in performing a transaction.

One of these sets of integrity rules are so-called dynamic semantical integrity rules. They refer for example to the question whether one or more prior transaction in a series of transactions was or were performed successfully. If this is the case, the present transaction may be performed. Otherwise, the present transaction may only be performed if it has no predecessors and is therefore a first transaction. In all other cases of this example, the present transaction may not be performed.

The specific prior transaction or transactions which must have been performed successfully depend on the present transaction to be performed. These specific prior transactions representing the specific integrity rules are therefore assigned to the present transaction to be performed. The examination of these prior transactions and the performance of the present transaction are now described in connection with FIGS. 1 and 2.

Figure 1:
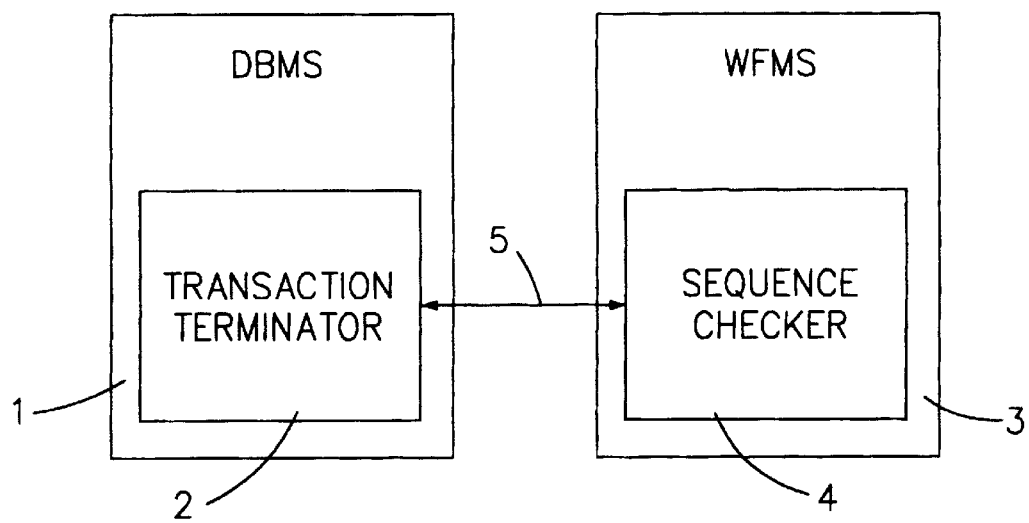
FIG. 1 shows a schematic block diagram of a method of performing a transaction on a database according to the invention.
Figure 2:
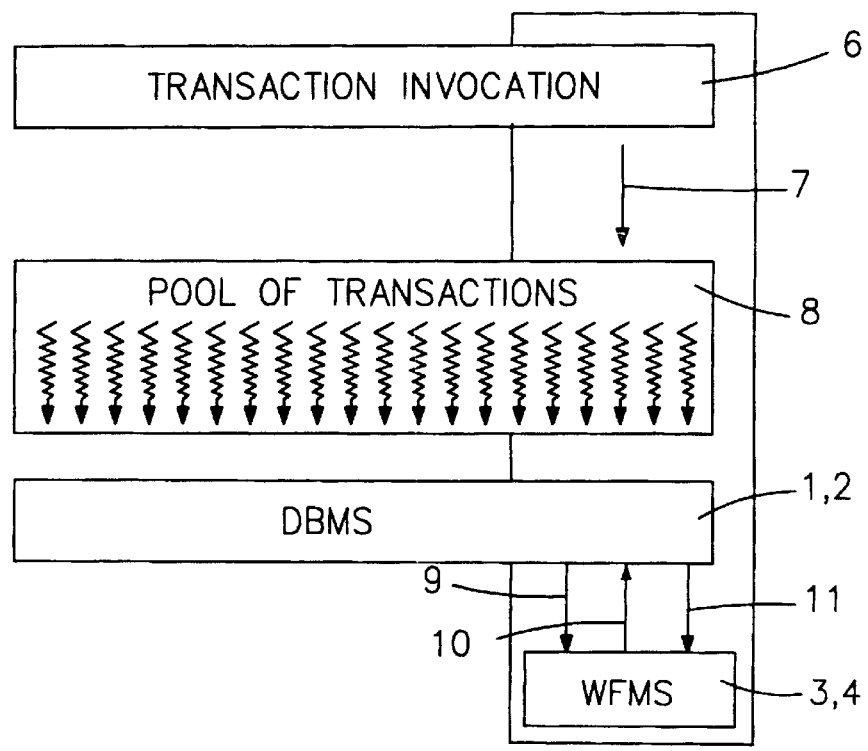
FIG. 2 shows a schematic block diagram of a computer system for performing a transaction on a database according to the invention.

FIG. 1 shows a database management system (DBMS) 1 which controls all data of a database. The DBMS 1 comprises a transaction terminator (TT) 2 which is a part of the DBMS 1 which may be added later to an existing DBMS 1. The TT 2 is the interface of the DBMS 1 to a workflow management system (WFMS) 3. The WFMS 3 comprises a sequence checker (SC) 4 which corresponds to the interface of the TT of the DBMS 1. Therefore, the SC 4 and the TT 2 are able to interchange data between each other which is shown by an arrow 5.

At least to some of the transactions included in a pool 8 of transactions, the WFMS 3 stores the rules or requirements which have to be fulfilled prior to the performance of the respective transaction. Any of these transactions is assigned to a node of a given workflow. The given workflow, i.e. the connections of these nodes represent the rules or requirements and have to be defined by the user of the database.

If a node of the workflow has for example mandatory three inputs, at least three rules have to be fulfilled prior to the performance of the transaction assigned to the respective node. These three rules are fulfilled if the three transactions assigned to the three nodes from which the three inputs originated, were performed successfully. If, as an example, one of these three transactions was not performed successfully, the corresponding rule is not fulfilled and the corresponding transaction must not be performed. If all rules are fulfilled, the transaction is performed. It is also possible to specify, that only a subset of the inputs, that means a subset of the rules have to be fulfilled.

If a node of a workflow has e.g. two outputs, the performance of a transaction has the consequence that the rule corresponding to the two inputs to which the two outputs lead to, are fulfilled. Using block 6 and arrow 7 of FIG. 2, a first transaction may be invoked by a user. The transaction to be performed is one of a number of transactions being provided in the pool 8 of transactions. All these transactions of the pool 8 of transactions are directed to the DBMS 1 with the TT 2 of FIG. 1.

Prior to the performance of the first transaction it is checked whether specific dynamic integrity rules have to be fulfilled. These rules or requirements are stored in the WFMS 3. The TT 2 of the DBMS 1 sends an inquiry to the SC 4 of the WFMS 3 and asks whether there are any requirements assigned to the first transaction to be performed, and, if yes, whether these requirements are fulfilled. This inquiry is shown by an arrow 9 in FIG. 2.

The SC 4 checks which node of a workflow of the WFMS 3 is assigned to the first transaction to be performed. It is now assumed that there is no prior node preceding the first transaction. This has the consequence that the first transaction is not dependent on any other prior transaction and may therefore be performed. The SC 4 sends an appropriate message to the TT 2. This is shown by an arrow 10 in FIG. 2. As no node is assigned to the first transaction, the successful performance of the first transaction is not relevant for any other transaction.

Then, a second transaction out of the pool 8 of transactions is invoked by the user and the TT 2 sends the respective inquiry to the SC 4, see arrow 9. It is now assumed that a node of the workflow is assigned to the second transaction, however, this node has no input but two outputs. The SC 4 finds the assigned node and checks the rules corresponding to this node. As there are no inputs to this node, there do not exist any rules or requirements in connection with this node. This has the consequence that the SC 4 sends an appropriate message to the TT 2, see arrow 10, so that the DBMS 1 may now perform the second transaction. After the successful termination of the second transaction, the TT 2 of the DBMS 1 sends an information to the SC 4 of the WFMS 3 which relates to the fact of the successful termination of the second transaction. This information is shown by an arrow 11 in FIG. 2.

The SC 4 of the WFMS 3 now stores this information in a manner which identifies the rule corresponding to the outputs of the node assigned to the successfully terminated transaction as being fulfilled. With respect to the second successfully terminated transaction, the two outputs of the node which is assigned to the second transaction are identified to be fulfilled. This means that those two nodes which are located in a later position of the workflow of the WFMS 3 and which have the two outputs as inputs are at least fulfilled with respect to those rules corresponding to these inputs.

If the second transaction is terminated successfully, the TT 2 sends an information about the successful termination of the second transaction to the SC 4. The SC 4 uses this information for changing the workflow state of the WFMS 3 accordingly.

Then, a third transaction is invoked by the user. This third transaction has e.g. three inputs and one output. One of these inputs is connected with one of the outputs corresponding to the second transaction.

The TT 2 of the DBMS 1 sends the inquiry to the SC 4 of the WFMS 3, see arrow 9. The SC 4 checks the node assigned to the third transaction. It is now assumed that rules relating to the two inputs not connected to the node corresponding to the second transaction are fulfilled. Then, the SC 4 checks whether the third rule, i.e. the third input of the respective node is also fulfilled. This depends on the successful termination of the second transaction.

If the second transaction has not yet or not at all been terminated successfully, the third input is not fulfilled and the third transaction may not be performed. The SC 4 generates an appropriate message, see arrow 10, and sends it back to the TT 2 of the DBMS 1. The DBMS 1 then does not perform the third transaction. No information according to arrow 11 is created by the TT 2.

If, however, the second transaction has been terminated successfully, the third input, i.e. the third rule of the respective node is fulfilled and the third transaction may be performed. The SC 4 generates an appropriate message, see arrow 10, and sends it back to the TT 2 of the DBMS 1. Then, the DBMS 1 performs the third transaction. After the successful termination of the third transaction, the TT 2 of the DBMS 1 creates the information about this successful termination and sends it to the SC 4 of the WFMS 3, see arrow 11. The SC 4 then updates the workflow state in the WFMS 3 accordingly.

The invention has been described with reference to several specific embodiments. One having skill in the relevant art will recognize that modifications may be made without departing from the spirit and scope of the invention as set forth in the appended claims.

Having thus described our invention, what we claim as new and desire to secure by Letters Patent is:

1. A method of automatically selecting and performing a processor-executed transaction on a database having an associated database management system, wherein a number of transactions are available to be performed by at least one processor on said database, and wherein at least one of said transactions may only be performed if corresponding requirements are fulfilled, wherein the fulfillment of said requirements depends on the prior successful termination of at least one other processor-executed transaction or on said at least one of said transactions being a first transaction, comprising the steps of:

invoking at least one of said transactions;

a transaction terminator in said database management system automatically determining, based on stored information related to prior successful terminations of related processor-executed transactions, whether said corresponding requirements are fulfilled;

if said requirements are fulfilled, selecting and performing said transaction by said at least one processor; and after a successful termination of said transaction, automatically storing dynamic information relating to said successful termination.

2. The method of claim 1 wherein, after a non-successful termination of said transaction, no information is stored.

3. The method of claim 1 further comprising information being processed as a transition of said database from a first state to a second state.

4. The method of claim 1 wherein said determining fulfillment of said requirements is checked by examining the present state of the database.

5. The method of claim 1 wherein a sequence checker is provided for checking whether said corresponding requirements are fulfilled and for storing said information.

6. The method of claim 5 wherein said sequence checker is associated with a workflow management system.

7. The method of claim 1 wherein a transaction terminator is provided and wherein said transaction terminator creates said information relating to said successful termination.

8. The method of claim 7 wherein said transaction terminator is associated with a database management system controlling said database.

9. A computer system for at least one processor to select and perform a transaction on a database, wherein a number of transactions are available to be performed on said database, and wherein at least one of said transactions may only be performed if corresponding requirements are fulfilled, wherein the fulfillment of said requirements depends on the prior successful termination of at least one other processor-executed transaction, comprising:

a database management system for selecting and invoking said at least one of said transactions, and for causing at least one processor to perform said transaction if said requirements are fulfilled;

a sequence checker for automatically determining whether said corresponding requirements are fulfilled based on stored information relating to prior successful terminations of related transactions by at least one processor; and a transaction terminator associated with said database management system for automatically providing dynamic information after successful termination of said transaction to be stored by said sequence checker.

10. The system of claim 9 wherein said sequence checker is associated with a workflow management system.

11. A program storage device readable by machine, tangibly embodying a program of instructions executable by the machine to perform method steps for automatically selecting and performing a processor-executed transaction on a database having an associated database management system, wherein a number of transactions are available to be performed by at least one processor on said database, and wherein at least one of said transactions may only be performed if corresponding requirements are fulfilled, wherein the fulfillment of said requirements depends on the prior successful termination of at least one other processor-executed transaction or on said at least one of said transactions being a first transaction, said method comprising the steps of:

invoking at least one of said transactions;

a transaction terminator associated with said database management system automatically determining, based on stored information related to prior successful terminations of related processor-executed transactions, whether said corresponding requirements are fulfilled;

if said requirements are fulfilled, selecting and performing said transaction by said at least one processor; and after a successful termination of said transaction, automatically storing dynamic information relating to said successful termination.

12. The system of claim 9 wherein said information relating to successful termination comprises transition information of said database from a first state to a second state.

13. The system of claim 9 wherein said checking for fulfillment of requirements comprises examining the present state of the database.

14. The system of claim 13 wherein said present database state is represented by an image of the database stored at said sequence checker.

15. The method of claim 4 wherein said present database state is represented by an image of the database.

* * * * *